United States Patent [19]
Cunniff et al.

[11] Patent Number: 5,842,015
[45] Date of Patent: Nov. 24, 1998

[54] SYSTEM AND METHOD FOR REAL-TIME CONTROL OF HARDWARE IN A MULTIPROCESSING ENVIRONMENT

[75] Inventors: Ross Cunniff; J. Norman Gee, both of Fort Collins, Colo.

[73] Assignee: Hewlett-Packard Company, Palo Alto, Calif.

[21] Appl. No.: 690,425

[22] Filed: Jul. 26, 1996

[51] Int. Cl.[6] ...................................................... G06F 9/00
[52] U.S. Cl. ........................... 395/674; 395/670; 711/148
[58] Field of Search .................... 395/674, 726, 395/670, 672, 673; 711/148; 380/25

[56] References Cited

U.S. PATENT DOCUMENTS

| | | | |
|---|---|---|---|
| 4,750,116 | 6/1988 | Pham et al. | 395/674 |
| 5,115,499 | 5/1992 | Stiffler et al. | 711/148 |
| 5,394,551 | 2/1995 | Holt et al. | 395/726 |
| 5,625,795 | 4/1997 | Sakakura et al. | 711/148 |
| 5,696,900 | 12/1997 | Nishigaya et al. | 395/200.59 |

OTHER PUBLICATIONS

BandixXL/Thunder Internal Reference Specification (Texture Daemon), HP Confidential Document, 1995, pp. 98–115 (Product: Visualize 48 Graphics Card).

Internal Confidential Information regarding Product: HP VX version 9.0 and later daemon, 1993, pp. 1–7 & 97.

Luther, Arch C., Audio is Real Time, Digital Video in the PC Environment, 1989, McGraw–Hill, pp. 68–70.

*Primary Examiner*—Majid A. Banankhan

[57] ABSTRACT

A hardware resource manager for real-time control of a hardware resource in a multiprocessing environment is disclosed. The hardware resource manager performs control and management functions for a limited hardware resource that can be accessed by multiple asynchronous application programs in order to achieve real-time response by the limited hardware resource. The hardware resource manager of the present invention comprises a shared memory buffer and a resource daemon. The shared memory buffer provides for semaphore locking capability so that only one application program may control the hardware resource manager at a time, and virtual memory capability for storing data and command information from the application programs. The resource daemon provides interpretation and processing capability for controlling the limited hardware resource via the data and command information received from the shared memory buffer. In addition, the daemon provides operational functionality that is matched to the type of limited hardware resource with which the hardware resource manager is associated, such as audio hardware or texture mapping hardware.

18 Claims, 7 Drawing Sheets

SYSTEM AND METHOD FOR REAL-TIME CONTROL OF HARDWARE IN A MULTIPROCESSING ENVIRONMENT

FIELD OF THE INVENTION

The present invention generally relates to the management of computer hardware and, more particularly, to a system and method for real-time control of hardware in a multiprocessing environment whereby multiple applications can access a limited hardware resource to produce real-time response to real-time events.

BACKGROUND OF THE INVENTION

Associated with most computer systems today are component subsystems or peripheral hardware for adding particular functionality to the computer system. For instance, a soundcard may be provided with a computer system as a piece of peripheral hardware in order to enable the computer system to render sounds associated with one or more application programs running on the computer system. As another example, a graphics hardware card may be provided with a computer system as a piece of peripheral hardware for assisting and accelerating the rendering of images by the computer system. However, a problem exists when a multitasking operating system runs on a computer system having a limited hardware resource that is accessed by multiple asynchronous application programs. Under these circumstances, the limited hardware resource is typically unable to respond fast enough to the commands of the multiple asynchronous application programs in order to provide real-time response when more than one application program desires to access the hardware resource at a time. While it is recognized that there are fully capable hardware resources that can adequately service multiple asynchronous application programs in a multitasking environment, such hardware is relatively expensive to manufacture, more difficult to configure, and more expensive to repair. It should be noted that for the purposes of the present disclosure, a limited hardware resource can be any integrated or peripheral hardware device having relatively limited capability.

Examples of two different types of hardware resources that often face the situation of having limited capabilities though operating in a multitasking environment are audio hardware and texture mapping hardware, as briefly described below.

On a computer system having multitasking capability, it is common for more than one application program to desire a sound(s) to be produced (e.g., rendered) in a real-time manner and at substantially the same point in time, usually in response to a particular event. Consequently, with a computer system having a limited audio hardware resource that is only capable of playing one sound at a time, when multiple sounds are requested to be played at the same or substantially the same time, the sounds are typically rendered in succession rather than simultaneously, as would be desired, because the application programs typically only have write permission to the hardware one at a time. In order to overcome this problem, one could provide the computer system with more capable audio hardware though such hardware is typically much more expensive, and often times provides for functionality not required by the computer system. Accordingly, the cost of the particular functionality sought in the more capable audio hardware is not justified because all the additional functionality is also included in the cost. Thus, it would be desirable to have a mechanism for controlling the limited audio hardware resource in a manner that would enable the computer system to provide multiple, asynchronous application programs real-time control of the audio hardware resource when operating in a multitasking environment.

With regard to graphics hardware in the multiprocessing environment, it is expected that several application programs operating asynchronously on a computer system will attempt to render an image via the graphics hardware at substantially the same time. If the graphics hardware has a relatively small amount of texture memory cache (i.e., a limited graphics hardware resource), then the graphics hardware will not be able to render the multiple images in real-time. Particularly, with a limited graphics hardware resource, this becomes problematic when the image(s) contains different textures or textures that require a large amount of memory, that is, more memory than provided in the texture memory cache. As with the audio hardware, it is recognized that there are graphics hardware resources with a sufficient amount of texture memory cache so as to allow essentially real-time response in rendering multiple images. However, as with the audio hardware resources, the capability that comes with such hardware also comes at a much higher cost relative to a limited graphics hardware resource.

Accordingly, a heretofore need exists in the industry for providing a system and method for real-time control of a limited hardware resource in a multitasking environment so that multiple asynchronous application programs can have essentially real-time control over the hardware resource.

SUMMARY OF THE INVENTION

The present invention overcomes the inadequacies and deficiencies of the prior art as discussed hereinbefore and as well known in the industry. The present invention provides for a hardware resource manager that can be employed within a computer system as a software program for controlling a limited hardware resource such as audio hardware, graphics hardware, video hardware, etc. In essence, the hardware resource manager enables multiple application programs operating in a multitasking environment on a computer system to access a limited hardware resource with real-time control. This enables the limited hardware resources to achieve equal, if not better, performance and flexibility than that of more expensive hardware resources.

A hardware resource manager in accordance with the present invention comprises a shared memory buffer, a resource daemon, and a socket connection interconnecting each application program and the resource daemon. For purposes of the present disclosure, the limited hardware resource is considered to be any integrated or peripheral hardware resource with relatively limited capability that is operating in an environment whereby multiple asynchronous application programs may seek access to the hardware resource at essentially the same time in order to effectuate a real-time response.

The shared memory buffer is an interprocess communication mechanism that enables high speed, real-time communication between multiple application programs and the daemon resource. The shared memory buffer achieves this by providing semaphore locking capability via a semaphore mechanism, and a high speed memory resource via virtual memory. The semaphore mechanism restricts access to the hardware to one application program at a time so as to prevent the application programs from overwriting each others request for control of the hardware resource. In the preferred embodiment, each application program includes an application program interface (API), thereby hiding the particular details of the shared memory buffer layout and command format from the application programs. The API also allows the resource daemon to change in response to changes in the underlying hardware resource. Accordingly, the shared memory buffer is configured to communicate directly with the application programs for transferring requests and/or data that are subsequently sent to the resource daemon and ultimately to the hardware resource.

The resource daemon manages the hardware resource, or at least a portion thereof, with essentially exclusive access to the hardware resource. The resource daemon receives the requests of the application programs from the shared memory buffer requesting control of the hardware resource, and then interprets and processes the requests. In processing the requests, the resource daemon may perform a variety of functions as required by the particular type of hardware resource to which the hardware resource manager is controlling, e.g., audio, texture mapping, or video hardware.

In addition, the hardware resource manager provides for a socket connection between each application program and the resource daemon as a secondary communication channel for nonreal-time communication between the application programs and the resource daemon. For instance, the socket connection may operate as a notification mechanism for indicating to either the resource daemon or application program that the other has exited or terminated.

The present invention also provides for a method for real-time control of a limited hardware resource in a multitasking environment that can be generalized as follows. Initially, command and data information is received from one or more of the application programs requesting an operation be performed via the limited hardware resource. The command and data information is received and stored in the shared memory buffer with the semaphore mechanism preventing more than one application program writing to the shared memory buffer at a time. When the resource daemon is ready to process additional command and data information, it retrieves the command and data information from the shared memory buffer. The resource daemon then interprets and processes the command and data information in order to provide real-time control over the limited hardware resource. The operations and functionality provided by the resource daemon varies depending on the particular type of limited hardware resource being managed and controlled by the graphics hardware resource.

In a first embodiment of the present invention, the limited hardware resource being managed by the hardware resource manager is audio hardware (e.g., a soundcard). In this first embodiment, the hardware resource manager is utilized to manage and control the playback and recording of sound by more than one application program at a time. The audio hardware is at least limited in that it is only capable of playing one sound at a time though it may have numerous other limitations with regards to resampling capability, buffering capability, or real-time interrupt capability, though one of skill in the art will quickly realize that there are any number of other limitations that could exist in the audio hardware that could be overcome by the present invention and that those listed above are merely illustrated. In the case of managing a limited audio hardware resource, the shared memory buffer includes a semaphore mechanism, a command field for storing hardware commands (e.g., a play or record request) from the application programs, an attribute field for storing sound attributes associated with the requests, a send buffer for storing sound data that is to be played, and a receive buffer for storing sound samples taken by the audio hardware.

The resource daemon includes a command interpreter for receiving the commands from the command field in the shared memory buffer and interpreting the commands into instructions for execution by the resource daemon. In addition, the command interpreter receives the socket connections from the application programs for maintaining notification when either the hardware resource manager or one of the application programs exits or terminates. The resource daemon further includes a defined sounds list for storing known sounds, a streamed sound buffer for storing streamed sounds prior to their play, an active list that identifies each sound to be played in a particular time slot, a sound mixer for mixing the sounds identified by the active list for a particular time slot, and a sample buffer for storing the mixed sound sample prior to its being sent to the audio hardware. The resource daemon also provides a record buffer for receiving and storing sampled sounds taken by the audio hardware resource prior to sending the sampled sounds to the received buffer and the shared memory buffer.

In a second embodiment of the present invention, the limited hardware resource being managed by the hardware resource manager is texture mapping hardware. In this second embodiment, the shared resource manager is utilized to manage and control mip-mapped texture for images being rendered by one or more application programs at a time. The texture mapping hardware is limited with respect to the amount of texture memory cache available for storing textures prior to their being used by the graphics hardware in rendering an image. The shared memory buffer of this second embodiment includes a semaphore mechanism, a command field for storing commands (e.g., rendering requests) from the application programs for controlling the texture mapping hardware, and a texture data buffer for storing texture data prior to sending the texture data to the resource daemon.

The resource daemon includes a command interpreter for translating and processing the request received from the command field of the shared memory buffer. In addition, the command interpreter also receives the socket connections from the application programs. In this second embodiment, the socket connections not only perform the notification function as described above with regards to the first embodiment, they additionally provide for other secondary communications which do not require real-time response. The resource daemon further includes a texture list for storing textured data, a hardware block list for storing hardware block representation of the texture data, and an interrupt service manager for downloading the correct hardware block to the texture cache in the texture mapping hardware.

The hardware resource manager of the present invention has many advantages, a few of which are delineated hereafter, as examples.

An advantage of the hardware resource manager of the present invention is that it provides real-time control by multiple asynchronous application programs of a limited hardware resource.

Another advantage of the hardware resource manager of the present invention is that it provides for greater flexibility and improved performance as compared to hardware management techniques of the prior art.

An advantage of the hardware resource manager of the present invention is that it utilizes socket connections for communicating with the application programs.

Other features and advantages of the present invention will become apparent to one with skill in the art upon examination of the following drawings and detail description. It is intended that all such additional features and advantages be included herein within the scope of the present invention, as defined by the appended claims.

BRIEF DESCRIPTION OF THE DRAWINGS

The present invention can be better understood with reference to the following drawings. The elements of the drawings are not necessarily to scale, emphasis instead being placed upon clearly illustrating principles of the present invention. Furthermore, like referenced numerals designate corresponding parts throughout the several views.

DETAILED DESCRIPTION OF THE PREFERRED EMBODIMENT

The hardware resource manager 10 can be stored on any computer-readable medium for use by or in connection with a computer-related system or method. In the context with this document, a computer-readable medium is an electronic, magnetic, optical, or other physical device or means that can contain or store a computer program for use by or in connection with a computer-related system or method.

I. Overview of the Hardware Resource Manager

Figure 1:
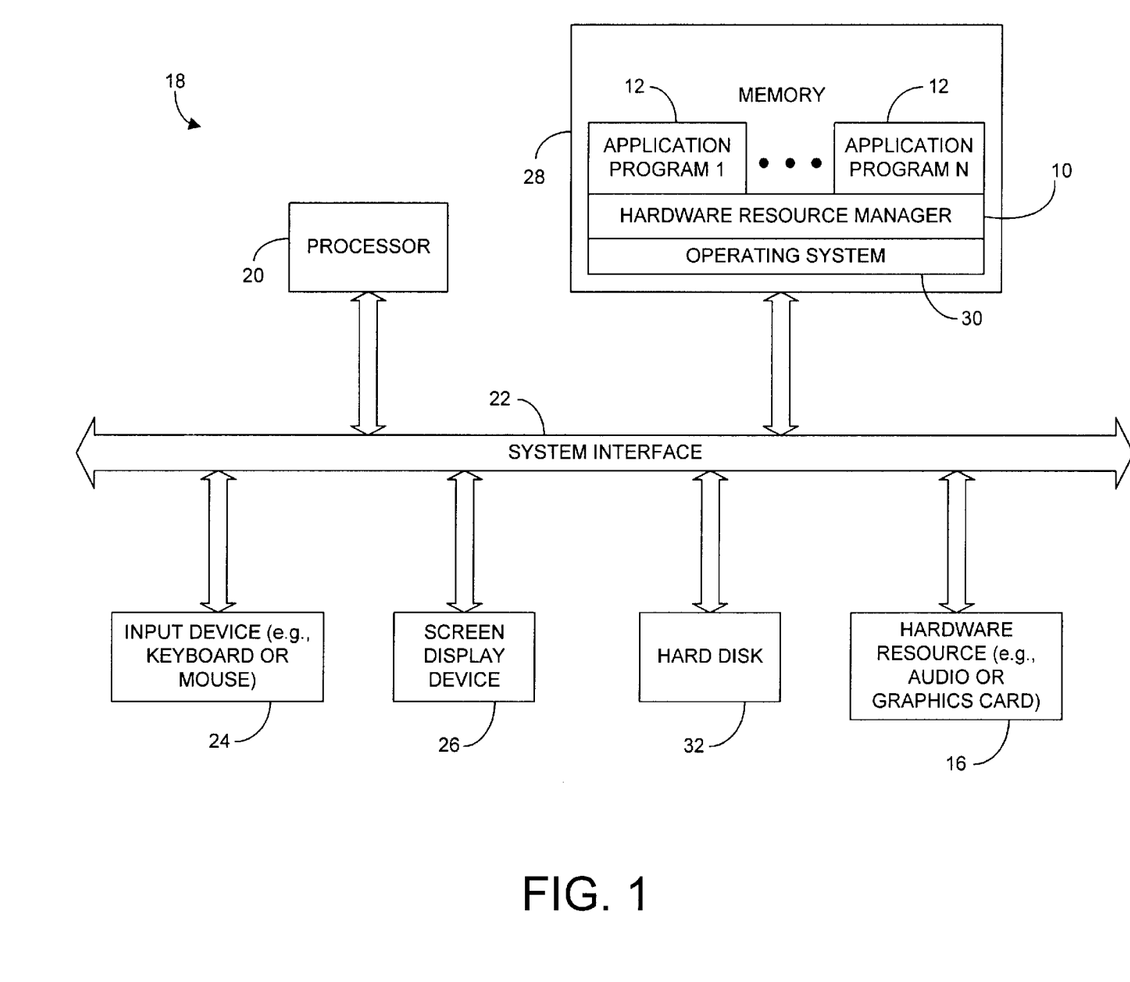
FIG. 1 a block diagram illustrating the hardware resource manager of the present invention situated within a computer-readable medium, for example, in a computer system.

As illustrated by way of example in FIG. 1, the hardware resource manager of the present invention along with its associated methodology can be employed in connection with more than one application program 12 for controlling and managing the use of an associated hardware resource 16 within a computer system 18. The computer system 18 comprises a conventional processor 20 that communicates to other elements within the computer via a system interface 22. For purposes of simplifying the illustration computer system 18, system interface 22 is illustrated as a single connection though it may comprise more than one bus for interconnecting various components of computer system 18. An input device 24, for example, a keyboard or mouse, is used to input data from a user of the computer system 18, and a screen display device 26 is used to output data to the user. A memory 28 within the computer system 18 stores the hardware resource manager 10. The hardware resource manager 10 is operated by a conventional multitasking operating system 30 for enabling asynchronous operation of multiple application programs 12. Further, a disk 32 is provided for additional memory space.

Figure 2:
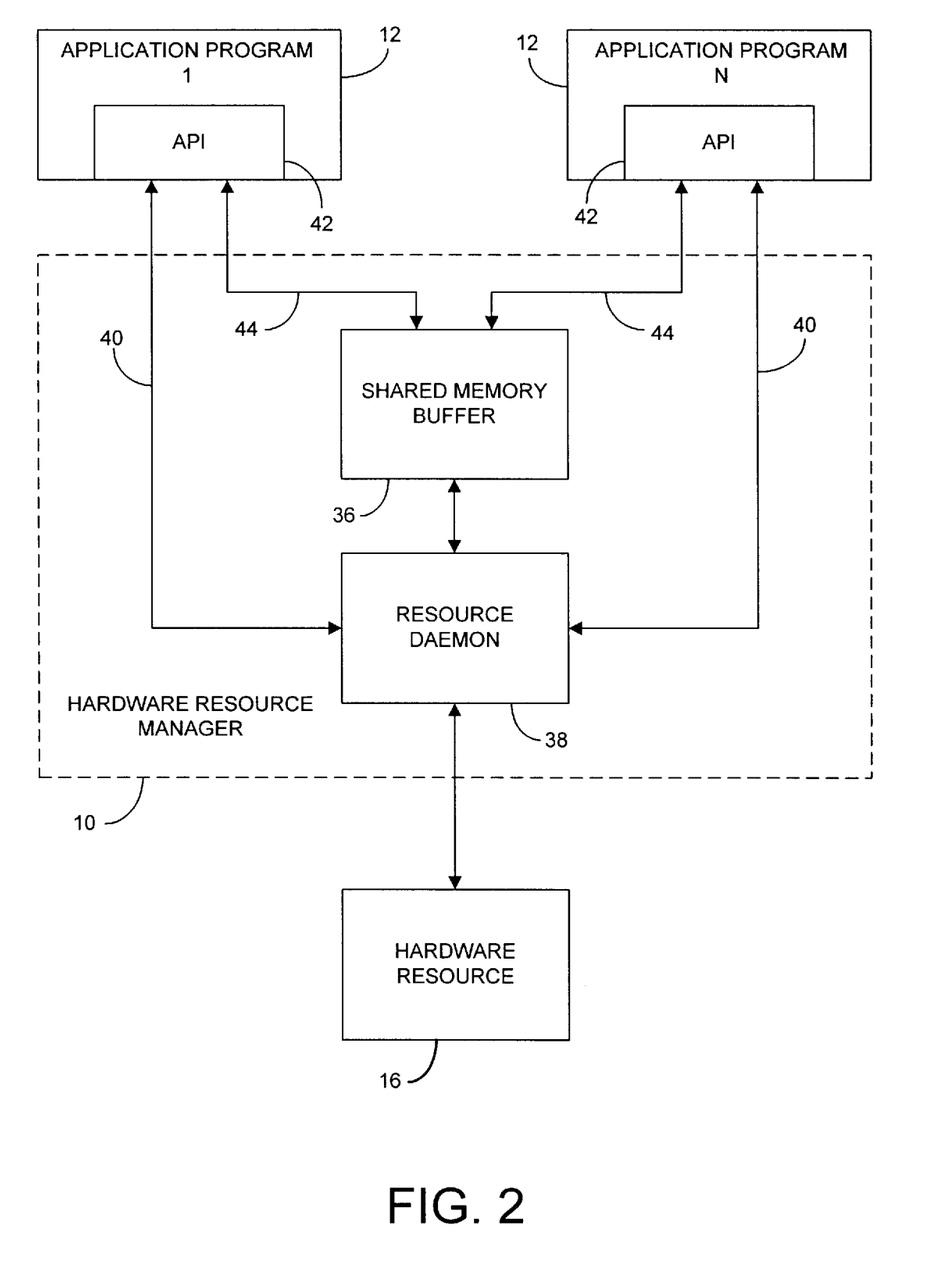
FIG. 2 is a block diagram illustrating the architecture and functionality of the hardware resource manager in connection with multiple application programs and a hardware resource.

The architecture and functionality of the hardware resource manager 10 are illustrated in more detail in FIG. 2. As shown in FIG. 2, the hardware resource manager 10 generally comprises a shared memory buffer 36, a resource daemon 38, and socket connections 40. In addition, it is noted that each application program 12 is provided with an application program interface (API) layer 42 through which the application programs interface the hardware resource manager 10 so as to simplify the programming of the application programs 12 and to allow for change in the command format of the shared memory buffer 36. This also allows the resource daemon 38 to change independent of the application programs in response to changes in underlying hardware 16.

The shared memory buffer 36 is an important component of the resource manager 10 in that it provides semaphore locking capability so that only one application program 12 is in control of hardware 16 at a time. The shared memory buffer 36 further provides for high speed, real-time communication between the application programs 12 and the resource daemon 38 via a virtual memory resource. The shared memory buffer 36 is configured to receive data information and command information from the respective application programs 12 over communication links 44. The communication links 44 preferably comprise two or more bi-directional connections, though they are collectively illustrated as a single link in FIG. 2 for purposes of simplifying the drawing. The data received by the shared memory buffer 36 is stored in virtual memory until required by the hardware 16. The commands received by the shared memory buffer 36 are typically requests made by the various application programs 12 for control over the hardware 16 in order to effectuate a particular action in the hardware 16. These commands are also stored in virtual memory within the shared memory buffers 36 until they are sent to the resource daemon 38. It is important to note that the semaphore mechanism protects the hardware resource manager from having more than one application program write to the shared memory buffer 36 at a time. This preserves the integrity of the shared resources of the shared memory buffer 36.

The resource daemon 38 is a mechanism that provides actual control over the operations of the hardware 16. The resource daemon 38 has essentially exclusive access to the hardware 16 and manages all control and data communications within computer system 18 that are directed to or from the hardware 16. The resource daemon 38 receives the commands of the application programs 12 from the shared memory buffer 36 and interprets the commands into appropriate instructions and then processes the instructions. In processing the instructions, the resource daemon 38 performs a variety of functions which depend upon the particular type of hardware 16 controlled by the hardware resource manager 10. The resource daemon 38 preferably runs in a continuous loop, sleeping for small intervals of time and then waking to perform the particular functions as required for the operation of the hardware 16. In a multi-processing environment, during the operation of one of the application programs 12, the application programs must relinquish the processor 20 so that the resource daemon 38 can interpret and process the commands from the shared memory buffer 36.

Further, the hardware resource manager provides for socket connections 40 between each application program 12 and the resource daemon 38. The socket connections 40 provide secondary communication channels for nonreal-time communication between the application programs 12 and the resource daemon 38. For instance, the socket connections 40 may be responsible for providing notification when one of the application programs 12 or the resource daemon 38 exits or terminates.

Figure 3:
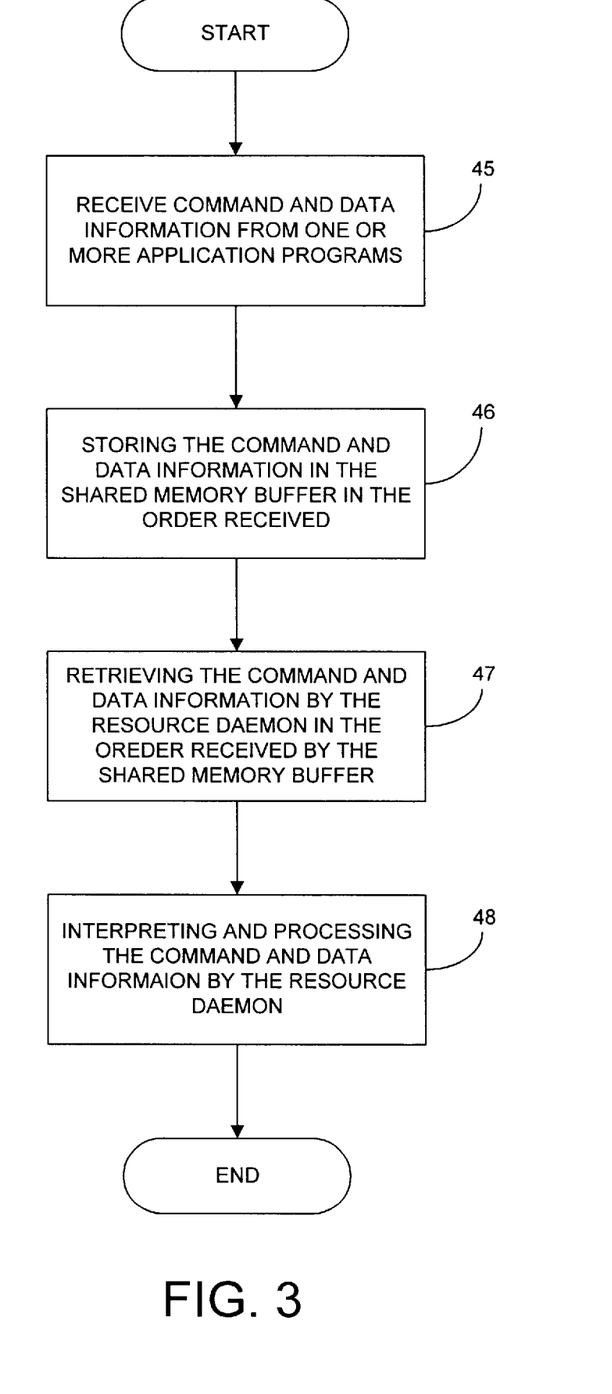
FIG. 3 is a flowchart of the operation of the present invention.

In operation, the present invention also provides a method for real-time control of a limited hardware resource in a multitasking environment that can be generalized by the following step as illustrated in FIG. 3. Initially, at step 45, command and data information is received from one or more of the application programs 12 requesting that an operation be performed via the limited hardware resource 16. The command and data information is stored in the shared memory buffer 36 in the order in which it is received, as indicated by step 46. At step 47, when the resource daemon 38 is ready to process additional command and data information, the resource daemon 38 retrieves the command and data information from the shared memory buffer 36 in the order in which the command and data information was received by the shared memory buffer. Then at step 48, the resource daemon 38 interprets and processes the command and data information in order to provide real-time control over the limited hardware resource. As mentioned above, the operations and functionality provided by the resource daemon varies depending on the particular type of limited hardware resource being managed and controlled by the graphics hardware resource.

In order to more thoroughly illustrate the functionality of the hardware resource manager 10, and to illustrate its extensibility, the following description of a first and second embodiments of a hardware resource manager 10 in connection with a limited audio hardware resource and a limited texture mapping hardware resource, respectively, is provided. However, as can be appreciated by one of ordinary skill in the art, the hardware resource manager 10 of the present invention is equally capable of managing other types of limited hardware resources in a multiprocessing environment in order to provide real-time control. Thus, the present description is not to be taken in a limiting sense but is made merely for the purpose of describing the general principles of the invention. The scope of the invention should be determined by referencing the appended claims.

II. Audio Hardware Resource Manager

A first embodiment of the audio hardware resource manager 10 described in the context of the hardware resource 16 being either integrated or peripheral hardware that is limited to only being able to play one sound at a time. However, it should be noted that many other limitations may exist in the audio hardware resource that could be overcome by the hardware resource manager 10, for example, but not limited to, limited resampling capability, limited buffering capability, or limited real-time interrupt capability. For purposes of describing the first embodiment of the hardware resource manager 10, general reference will be made to the architecture and functionality illustrated in FIG. 2, and specific reference will be made to the particular implementation of the shared memory buffer 36 as an audio shared memory buffer 36' and the resource daemon 38 as an audio resource daemon 38', as illustrated in FIGS. 3 and 4, respectively.

Figure 4:
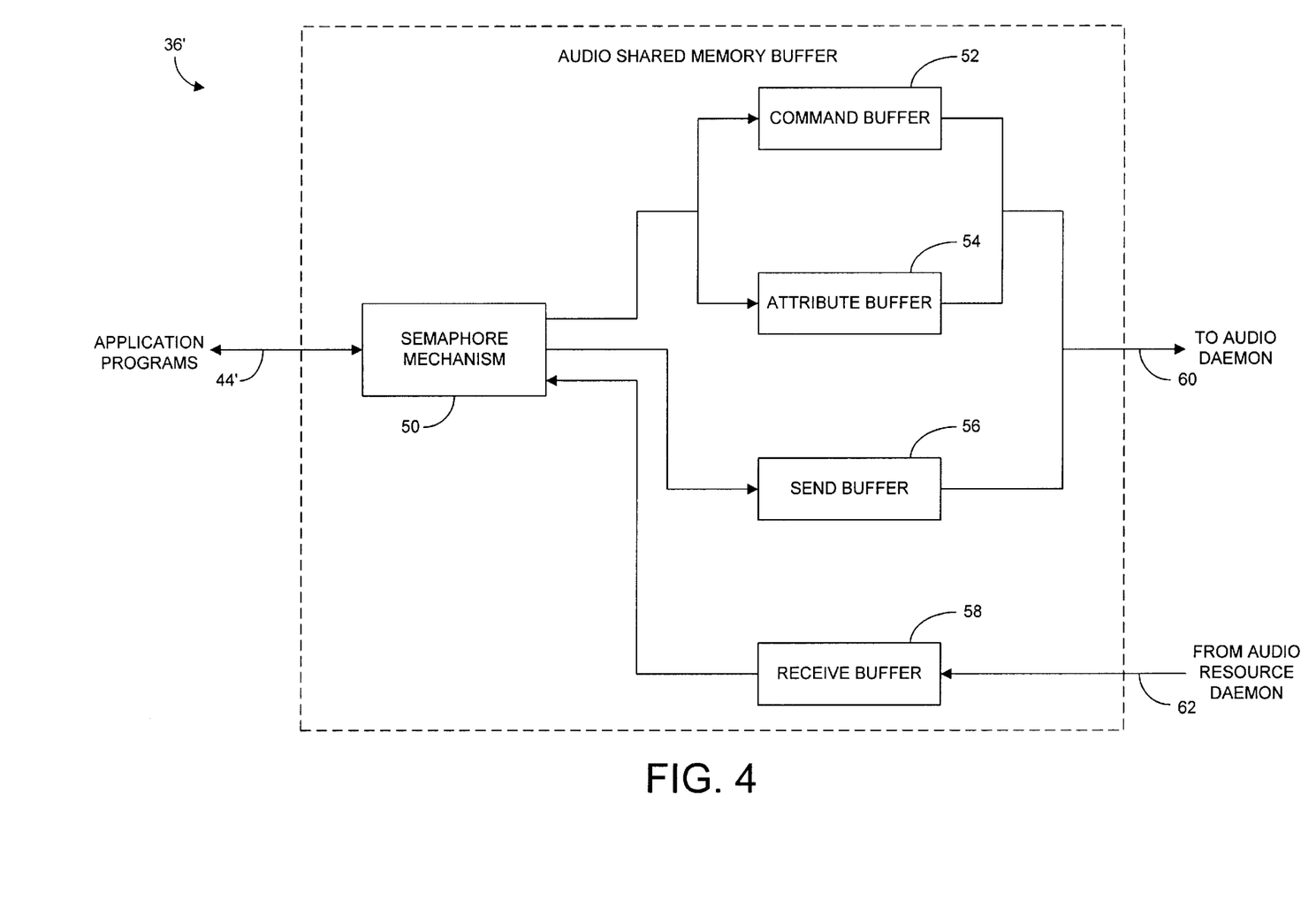
FIG. 4 is a block diagram illustrating an implementation of the shared memory buffer of FIG. 2 for the first embodiment of the hardware resource manager for use with audio hardware.

With reference to FIG. 4, the audio shared memory buffer 36' comprises a semaphore mechanism 50, a command field 52, an attribute field 54, a send buffer 56, and a receive buffer 58. A semaphore mechanism 50 is configured to receive data information and command information from each of the application programs 12 over the communication links 44'. The semaphore mechanism 50 controls access to the audio shared buffer memory 36' for performing semaphore locking so that only one application program 12 at a time can write to the command field 52, the attribute field 54, or the send buffer 56, or read from the receive buffer 58. This ensures that the application programs 12 do not overwrite each others commands or data stored in the audio shared memory buffer 36'.

The command field 52 receives command information (i.e., commands) from the respective application programs 12, via the communication link 44' and the semaphore mechanism 50, and stores the commands until the audio resource daemon 36' is ready to interpret and process the command. Accordingly, a command field 52 is configured in a first-in-first-out (FIFO) manner so that the commands from the application programs 12 are interpreted and processed in the order that they are received by the audio shared memory buffer 36'. Examples of the commands that may be sent by an application program 12 to the hardware resource manager 10 may include but are not limited to defining a sound (giving a sound I.D. and sound data), play a defined sound at a given frequency, volume, and/or attenuation, stream a sound, and record a sound.

The attribute field 54 is provided by the audio shared memory buffer 36' to receive and store the attributes of the sound associated with a play command that is stored in the command field 52. For instance, the attribute field 54 may include attributes that define the frequency, volume, or left and/or right attenuation associated with a play command. As with the command field 52, attribute field 54 is configured in a FIFO manner so that the command and associated attributes are delivered to the audio resource daemon 38' together.

The send buffer 56 and receive buffer 58 are provided by the audio shared memory buffer 36' to enable storage of sound data that is being sent between one of the application programs 12 and the audio resource daemon 38'. Particularly, this can include storing sound data in the send buffer 56 that is to be played by the audio hardware 16' (FIG. 5), or to storing sound data in the receive buffer 58 that was sampled by the audio hardware 16'.

The sound data and command information from the audio shared memory buffer 36' is sent to the audio resource daemon 38' via a communication link 60. Conversely, sampled sound data is received from the audio daemon resource 38' over a communication link 62.

It is worth noting that each of the command field 52, the attribute field 54, the send buffer 56, and the receive buffer 58 are implemented in shared memory that is accessible by each application program 12 so as to provide high speed interprocess communication between the application programs 12 and the audio resource daemon 38'. This is in contrast to previous schemes in the prior art whereby socket connections where utilized for message passing limited by the operating systems turn around time in multitasking. However, in the case of the present invention, the shared memory provides high speed message passing.

Figure 5:
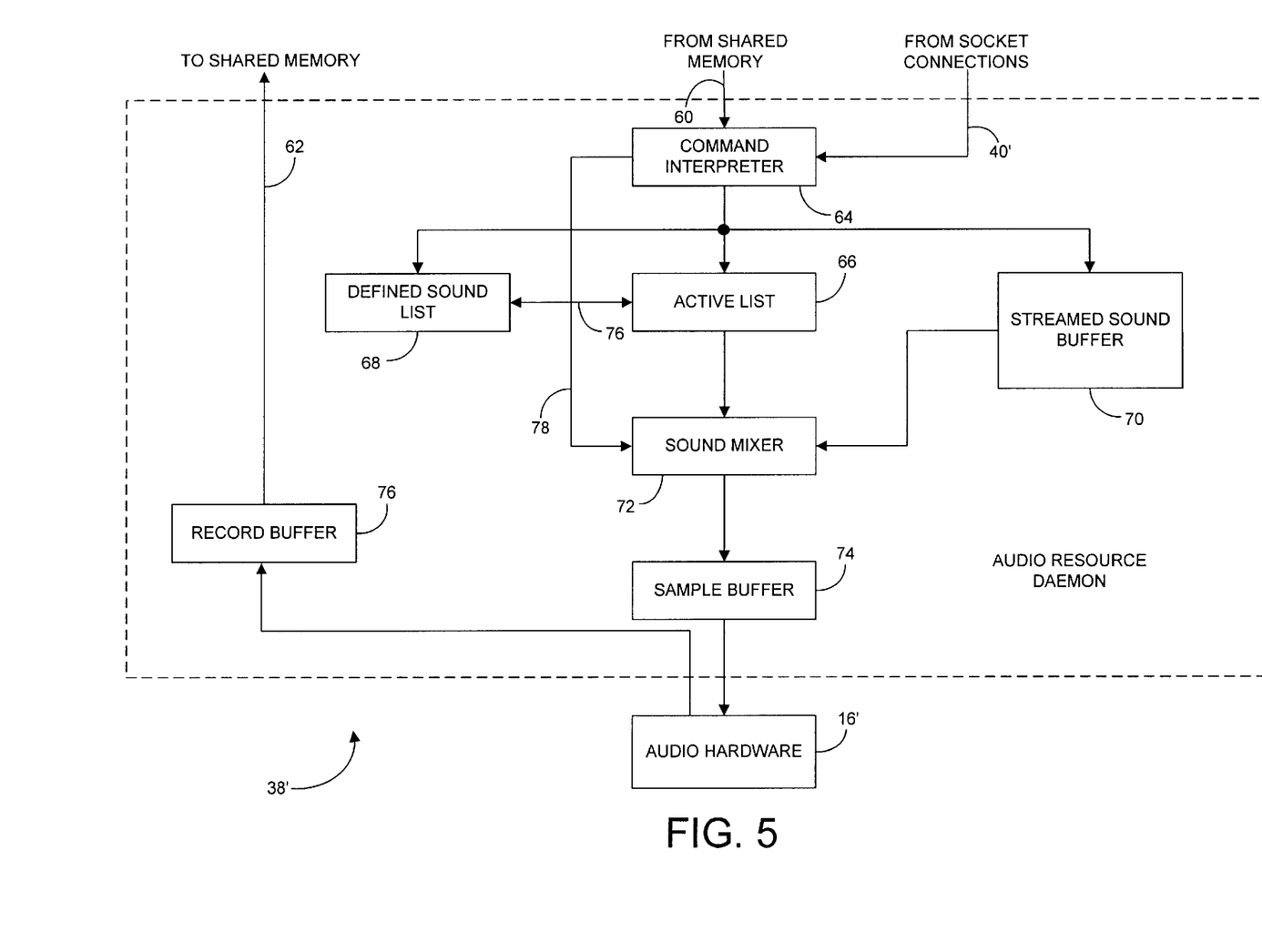
FIG. 5 is a block diagram illustrating an implementation of the resource daemon of FIG. 2 for the first embodiment of the hardware resource manager for user with audio hardware.

With reference to FIG. 5, the audio resource daemon 38' is configured to control communication with and management of the audio hardware 16'. Accordingly, the audio resource daemon 38' comprises a command interpreter 64, an active list 66, a defined sounds list 68, a streamed sound buffer 70, a sound mixer 72, a sample buffer 74, and a record buffer 76. The command interpreter 64 is an important part of the audio resource daemon in that it receives the sound data and command/attribute information from the audio shared memory buffer 36' via the communication link 60. The command interpreter 64 can perform many functions such as the following: checking the socket connections 40' for data client processes and intermediate resources allocated by them, checking the audio shared memory buffer 36' for commands and responding to them, adding sounds to the active list 66, and removing sounds from the active list 66. Further, the command interpreter 64 receives the socket connection 40' from each of the application programs 12. In this first embodiment, the socket connections are used to notify the hardware resource manager or the application program if the other exits or terminates. However, it is noted that the socket connections 40' can be extended to a variety of communication functions as well known in the industry.

The command and attribute information received from the command field 52 and the attribute field 54, respectively, is interpreted into instructions for execution by the audio resource daemon 38'. The command interpreter 64 then processes the instructions and provides sound pointers to the active list 66 that point to defined sounds in the defined sounds list 68 that are to be sent to the sound mixer 72. Thus, in essence, the active list 66 is an index into the defined sounds list 68. The active list 66 accesses particular sounds in the defined sounds list 68 via mapping tables. Accordingly, the defined sounds list 68 comprises a memory buffer of defined sound addresses and mapping tables corresponding to the mapping tables in the active list 66.

In regard to sound data, the command interpreter 64 decides, based upon the commands it receives from the shared memory buffer 36', whether it needs any sound data from the send buffer 56. If any sound data is retrieved by the command interpreter 64 from the send buffer 56 of the audio shared memory buffer 36', the command interpreter 64 distributes the sound data to either the defined sounds list 68 or the streamed sound buffer 70, as described in detail below.

The sound mixer 72 receives commands from the command interpreter 64 via a communication link 78. The sound mixer takes the defined sounds in the active list 66 that are to be mixed together into a single slice of time and mixes the sounds accordingly. In order to play sound in real-time, the sound mixer 72 preferably prepares a sound package of mixed defined sounds for play every 0.25 seconds, though this time internal can vary according to the real-time requirements of an application. However, in addition to the defined sounds received by sound mixer 72 from the active list 66, the sound mixer 72 can also receive streamed sounds from the streamed sound buffer 70.

The streamed sound buffer 70 is provided for playing sounds segments that come in from a continuous source such as digital audio transmitted to an application program 12 from a remote source. Therefore, these sound segments must be downloaded to the audio resource daemon 38' from the send buffer 56 of the shared memory buffer 36'.

Once the sound mixer 72 has mixed the appropriate sounds for a single time slice, the mixed time slice is then downloaded into the sample buffer 74. The sample buffer 74 stores the sound package until the audio hardware 16' is ready to play that sound package at which time it is retrieved by the audio hardware 16' and played.

In addition to playing sounds, the hardware resource manager 10 is capable of taking sound data sampled by the audio hardware 16' and managing the transfer of that sound data back to the application program 12 requesting it. For this purpose, a record buffer 76 is provided by the audio resource daemon 38' for receiving the sampled sound data. This data is subsequently sent to the receive buffer 58 of the audio shared memory buffer 38' via communication link 62. Ultimately, the application program 12 requesting this sound data retrieves the data from the receive buffer 58 via the communication link 44'.

III. Texture Mapping Hardware Resource Manager

A second embodiment of the present invention is in the context of managing a limited texture mapping hardware resource in a multitasking environment whereby multiple application programs 12 desire to access control over the texture mapping hardware resource for rendering an image. For purposes of the present disclosure, the texture mapping hardware resource is merely a component of a graphics hardware system 96 (FIG. 7) having a relatively limited amount of onboard texture memory cache. Consequently, when an application program 12 desires to render an image with many different textures or one texture that requires more memory than that provided by the texture mapping hardware, or if more than one application program 12 desires to render an image with more than one texture at a time, the texture mapping hardware resource would be unable to render the images in a real-time manner. However, the second embodiment of the present invention provides for the hardware resource manager 10 (FIG. 2) comprising the shared memory buffer 36 implemented as a texture mapping shared memory buffer 36", as illustrated in FIG. 6, and the resource daemon 38 implemented as a texture mapping resource daemon 38", as illustrated in FIG. 7.

Figure 6:
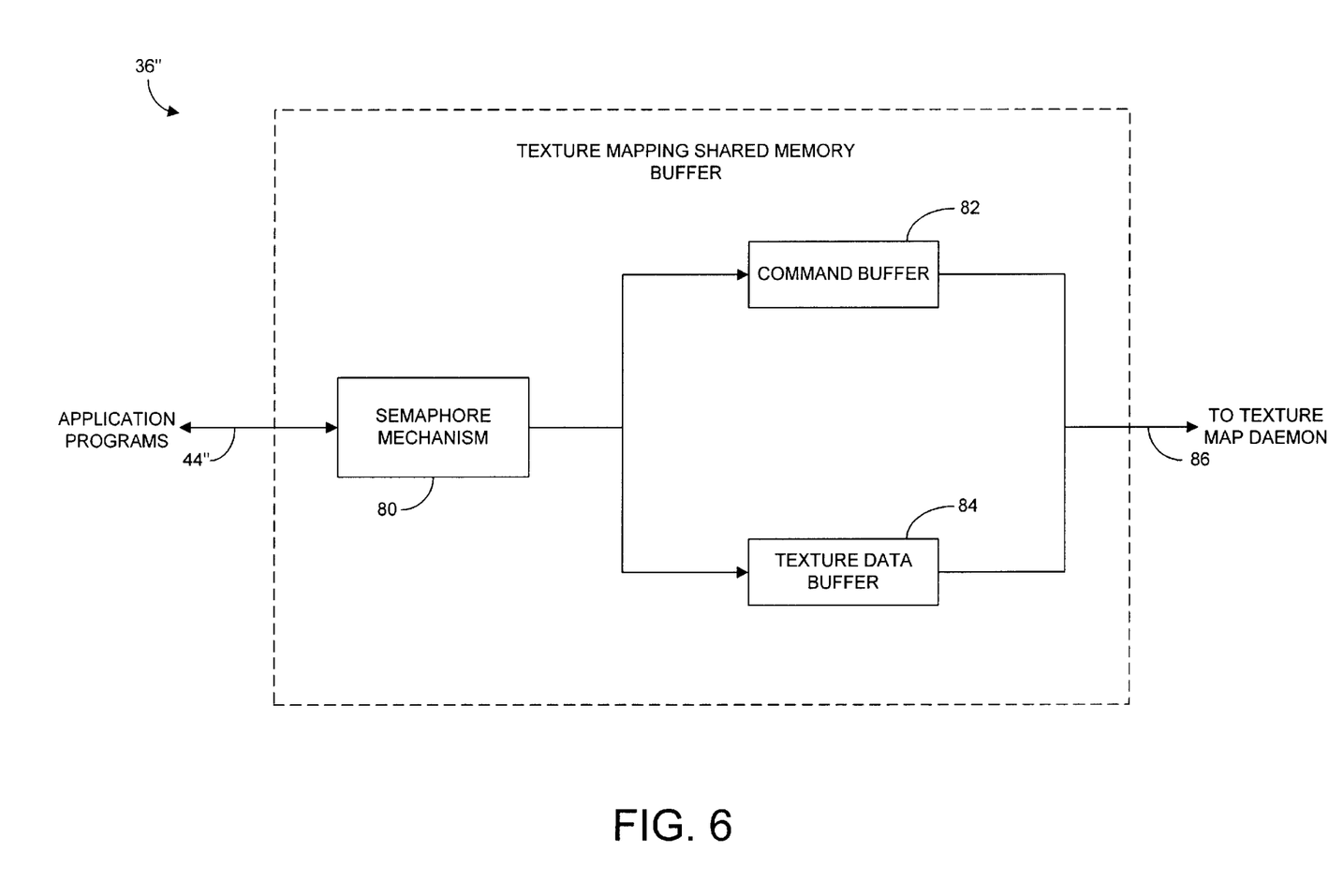
FIG. 6 is a block diagram illustrating an implementation of the shared memory buffer of FIG. 2 for the second embodiment of the hardware resource manager for use with texture mapping hardware.

With reference to FIG. 6, the texture mapping shared memory buffer 36" comprises a semaphore mechanism 80, a command field 82, and a texture data buffer 84. The semaphore mechanism 80 is substantially similar to the semaphore mechanism 50 of the audio shared memory buffer 36'. The semaphore mechanism 80 performs semaphore locking so that only one application program 12 has access to the command field 82 and the texture data buffer 84 at a time via their respective communication links 44". The command field 82 receives the commands from the application programs 12 via the semaphore mechanism 80, and subsequently sends them to the texture mapping daemon 38" via communication link 86. Examples of commands that can be sent through the command field 82 are activated texture, deactivated texture, or establish a priority for a given set of defined textures. The texture data buffer 84 stores texture data from the application programs 12 that is to be subsequently sent to the texture mapping daemon 38" via communication link 86. As with the audio shared memory buffer 36', the texture mapping shared memory buffer 36" is implemented in virtual memory so as to provide high speed, real-time communication between the application programs 12 and the texture mapping daemon 36".

Figure 7:
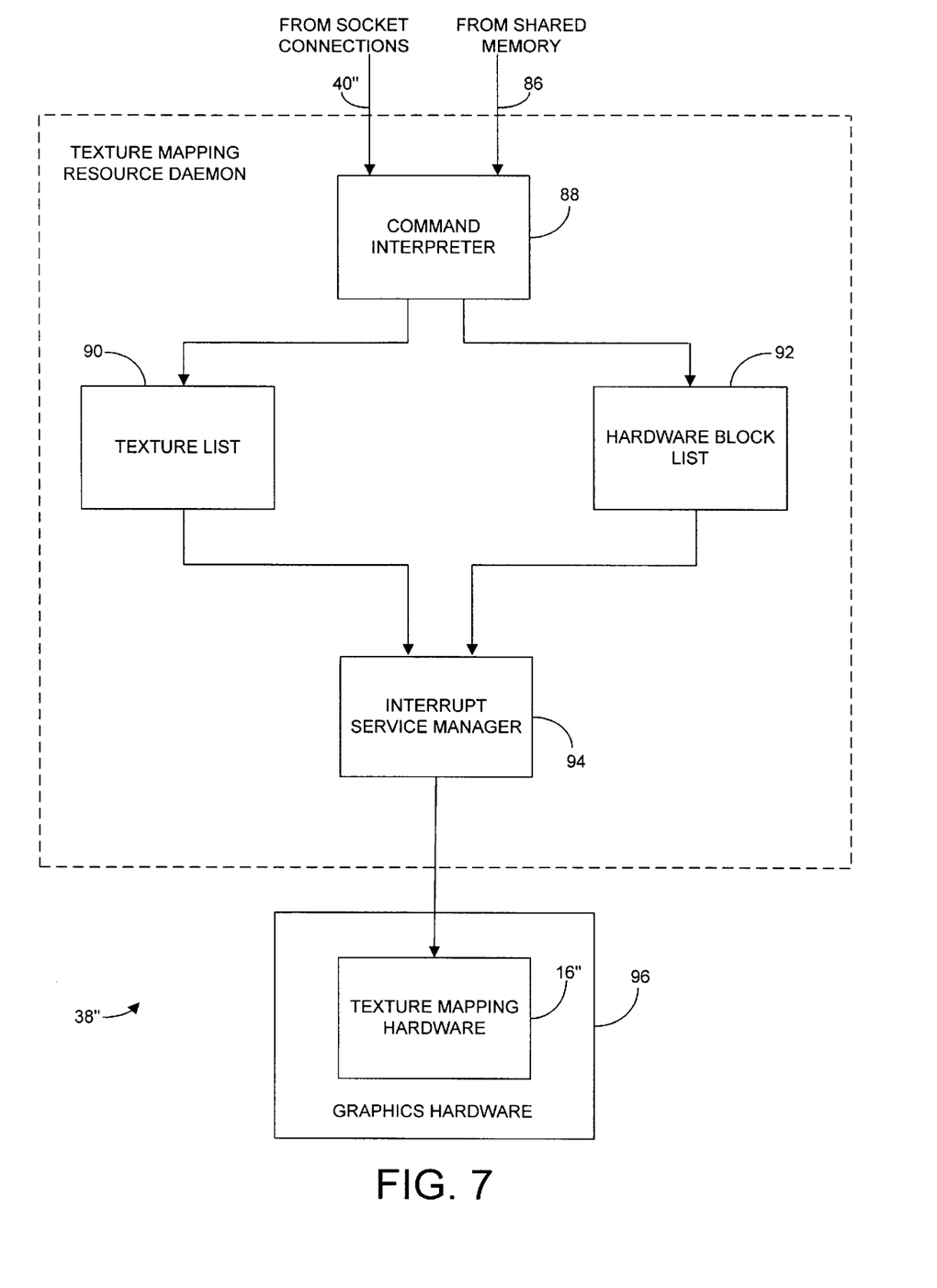
FIG. 7 is a block diagram illustrating an implementation of the resource daemon of FIG. 2 for the second embodiment of the hardware resource manager for managing texture mapping hardware.

With regard to FIG. 7, the texture mapping resource daemon comprises a command interpreter 88, a texture list 90, a hardware block list 92, and an interrupt service manager 94. The command interpreter 88 performs substantially the same functions as the command interpreter 64 of the audio resource daemon 38', that is, the command interpreter receives the commands from the command field 82 of the texture mapping shared memory buffer 36" via communication link 86, and then interprets and processes the commands. In addition to receiving commands from the texture mapping shared memory buffer 36", the command interpreter 88 can also receive nonreal-time commands via the socket connections 40" from the application programs 12. For instance, a command provided over a socket connection 40" may include defining a new texture. The socket connections 40" also provide for notification to either the application programs 12 or the hardware resource manager 10 when the other has exited or terminated.

Examples of the commands that can be interpreted and processed by the command interpreter 88 include activating a texture which essentially causes hardware blocks in the hardware block list 92 to be allocated to hold the texture data contained in the texture list 90, and downloading the hardware blocks to the texture mapping hardware 16", and deactivating a texture which essentially frees up resources in a hardware block list 92.

The texture list 90 includes a complete list of mip-mapped texture data provided by the application programs 12. The API 42 associated with each application program 12 provides a mechanism for specifying this data, but rather than going directly to the texture mapping hardware 16", the data is communicated through either the texture mapping shared memory buffer 36" or through a socket connection 40", and is thereafter managed by the texture mapping resource daemon 38".

The hardware block list 92 provides a means by which textures in the texture list 90 are mapped to storage locations in the texture cache (not shown) within the graphics hardware 96. The hardware block list 92 essentially records which storage locations in the hardware have been used to store texture data.

Lastly, the interrupt service manager 94 is provided by the texture mapping daemon 38" for downloading texture data from the texture list 90 to the texture mapping hardware 16" as needed.

In concluding the detailed description, it should be noted that it will be obvious to those skilled in the art that many variations and modifications may be made to the preferred embodiment without substantially departing from the principles of the present invention. Also such variations and modifications are intended to be included herein within the scope of the present invention, as set forth in the following claims. Further, in the claims hereafter, the corresponding structure, materials, acts, and equivalence of all means or step plus function elements are intended to include any structure, material, or acts for performing the functions in combination with other claimed elements as specifically claimed.

Wherefore, the following is claimed:

1. A hardware resource manager for providing real-time control over a limited hardware resource in a computer system capable of running asynchronous application programs, comprising:
   a shared memory buffer residing within said computer system for storing command and data information from one of said application programs, and a semaphore mechanism for restricting access to said shared memory buffer to one said application program at a time, said application program residing within said computer system; and
   a resource daemon residing within said computer system for receiving command and data information from said shared memory buffer, and for interpreting and processing said command and data information to control operation of said limited hardware resource within said computer system.

2. The hardware resource manager of claim 1, further comprising socket connections interconnecting said application programs to said resource daemon.

3. The hardware resource manager of claim 1 wherein said limited hardware resource is audio hardware.

4. The hardware resource manager of claim 1, wherein said limited hardware resource is texture mapping hardware.

5. The hardware resource manager of claim 1, wherein each said application program is provided with an application program interface (API) suitable for communicating with said hardware resource manager.

6. The hardware resource manager of claim 1, wherein said resource daemon includes a command interpreter for interpreting said command and data information into executable instructions.

7. The hardware resource manager of claim 1, wherein said shared memory buffer is implemented in virtual memory space.

8. The hardware resource manager of claim 2, wherein said, socket connections are utilized to communicate a termination of one said application programs to said resource daemon, and to communicate a termination of said resource daemon to said application programs.

9. The hardware resource manager of claim 3, wherein said shared memory buffer includes a command field buffer for storing said command information, an attribute field buffer for storing attributes associated with said command information, and a send buffer for storing said data information.

10. The hardware resource manager of claim 3, wherein said resource daemon includes a command interpreter for interpreting said command information, a defined sounds list for storing defined sounds, an active list for storing a list of sounds to be play in a particular slice of time, a streamed sound buffer for storing streamed sound data, and a sound mixer for mixing sounds.

11. The hardware resource manager of claim 4, wherein said shared memory buffer includes a command field for storing said command information, and a texture data buffer for storing texture data associated with said command information.

12. The hardware resource manager of claim 4, wherein said resource daemon includes a command interpreter for interpreting said command information, a texture list for storing texture data, a hardware block list for mapping texture data in said texture list to storage locations in said texture mapping hardware, and an interrupt service manager for downloading said texture data from said texture list to said texture mapping hardware according to mapping of said hardware block list.

13. A method for providing real-time control over a limited hardware resource in a computer system capable of running multiple, asynchronous application programs, said method comprising the steps of:
   receiving command and data information from said application program residing within said computer system;
   storing said command and data information in a shared memory buffer residing within said computer system;
   transferring said command and data information from said shared memory buffer to a resource daemon residing within said computer system;
   interpreting said command information into executable instructions by said resource daemon for enabling real-time control of said limited hardware resource within said computer system; and
   processing said instructions by said resource daemon, including providing said limited hardware resource with said data information as needed for operation of said limited hardware resource;

whereby each of said application programs is able to control operation of said limited hardware resource within said computer system in substantially real-time fashion.

14. The method of claim 13, wherein said command and data information is transferred to said resource in an order received by said shared memory buffer.

15. The method of claim 13, further including the step of communicating a termination of one of said application programs to said resource daemon via a socket connection.

16. The method of claim 13, further including the step of protecting said shared memory buffer with a semaphore mechanism that prevents more than one of said application programs writing to said shared memory buffer at a time.

17. The method of claim 13, wherein said shared memory buffer is implemented in virtual memory space.

18. A computer program for providing real-time control over a limited hardware resource in a computer system capable of running asynchronous application programs, said computer program comprising:

shared memory buffer means residing within said computer system for storing command and data information from one of said application programs, and a semaphore mechanism for restricting access to said shared memory buffer to one of said application programs at a time, said application program located within said computer system; and resource deamon means located within said computer system for receiving command and data information from said shared memory buffer means, and for interpreting and processing said command and data information to control operation of said limited hardware resource within said computer system.

\* \* \* \* \*